June 28, 1960 W. CLAYTON 2,942,788
STEAM CLEANER WITH HYDRAULIC SHOCK COMPENSATOR
Filed May 18, 1959
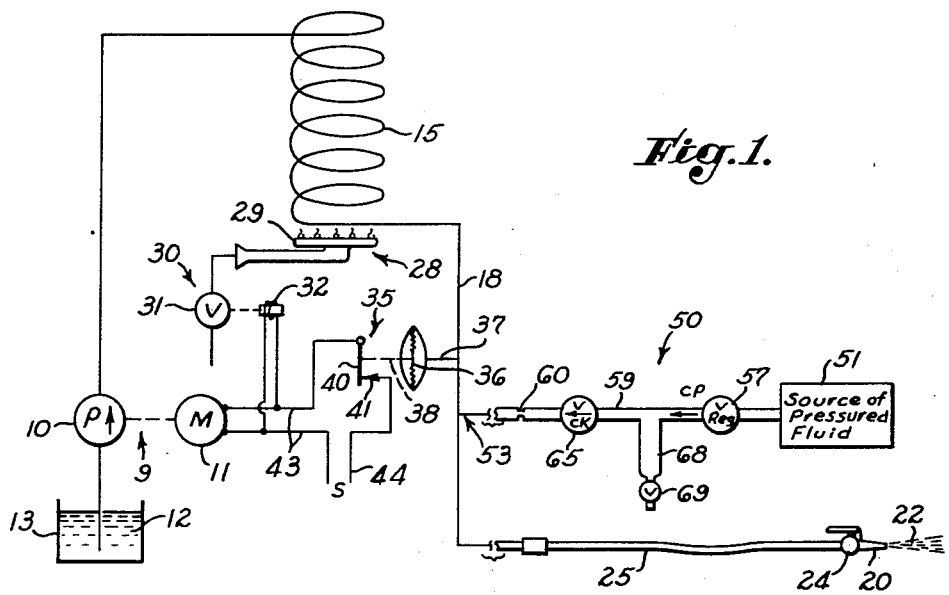
*Fig. 1.*
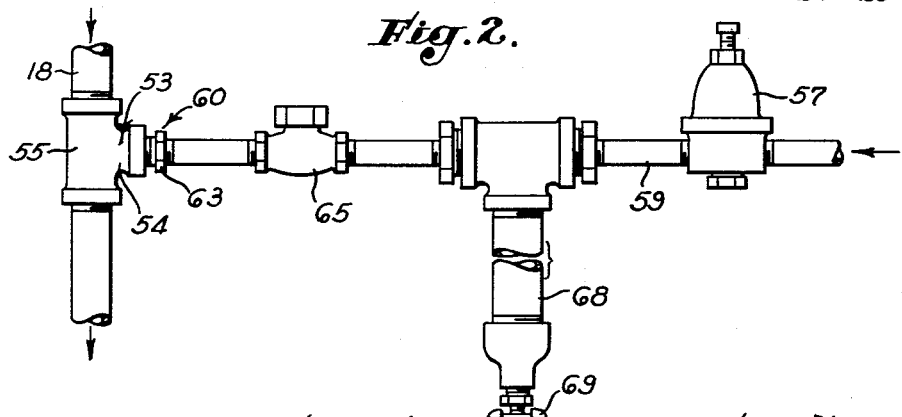
*Fig. 2.*
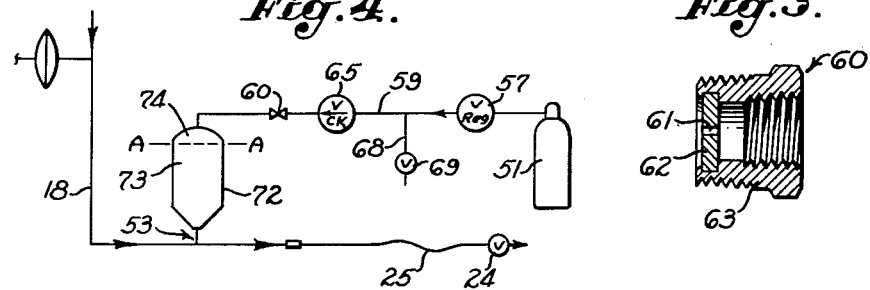
*Fig. 4.* *Fig. 3.*
INVENTOR.
WILLIAM CLAYTON
BY HIS ATTORNEYS.
HARRIS, KIECH, RUSSELL & KERN United States Patent Office  2,942,788
Patented June 28, 1960

2,942,788

STEAM CLEANER WITH HYDRAULIC SHOCK COMPENSATOR

William Clayton, Pasadena, Calif., assignor to Clayton Manufacturing Company, El Monte, Calif., a corporation of California Filed May 18, 1959, Ser. No. 813,920

11 Claims. (Cl. 239—137)

This invention relates to cleaning devices and more particularly to devices producing cleaning jets composed partially of liquid and partially of steam. Such devices are sometimes known as steam cleaners and are useful in removing accumulations of dirt, grease, tar, etc., from automobiles and machinery items.

Steam cleaning machines of this type commonly employ a heating coil providing a flow passage through which a stream of a soap solution or other cleaning liquid is pumped. A heater such as a gas burner heats the liquid a sit flows through the heating coil and thence through a discharge line terminating in a jet-producing orifice, the flow being under the control of a nearby control valve. The flowing column of cleaning liquid is normally heated to such extent that when it is released into the atmosphere a small amount of the liquid, typically about 10%, flashes into steam to create the desired velocity for proper cleaning impact.

It is desirable that the heating and pumping functions be under the control of the control valve, which is often positioned remote from the coil near the end of a flexible hose forming a portion of the discharge line. Attempts have been made to control both the heater and the pump in response to changes in pressure which occur in the system when opening and closing the control valve. For example, in a machine set to operate at a normal pressure of 100 p.s.i. gage while delivering say, 100 gallons of cleaning liquid per hour heated to approximately 328° F., closing of the control valve at the position of use of the equipment causes the pressure to increase rapidly. In the example being considered, it would be desirable to employ a pressure switch to stop the heat and the feed when the pressure reaches 125 p.s.i. and to automatically restart the heat and the feed when, upon later reopening of the control valve, the pressure drops to 80 p.s.i. However, installation of a pressure switch or other pressure responsive device which will shut down and restart the equipment at such upper and lower limits is not a complete solution of the problem of controlling the machine in response to the opening and closing of the control valve.

When the control valve closes to shut down the feed and the heat during a desired off cycle the machine and the liquid therein gradually cool. The cooling of the liquid reduces its volume and therefore the pressure in the machine. When the pressure drops to the exemplified 80 p.s.i. cut-in value, the feed and the heat come on simultaneously. If the remote valve is still closed, it requires only a short time for the pump to supply enough liquid to raise the pressure to the exemplified 125 p.s.i. cut-off value. As a result, there is a severe shock to the equipment before the pump can again be stopped, resulting in overloads on the entire system, the shock occurring in part from a water-hammer effect as the flow is started and stopped. In addition, the water pumped into the coil tends to cause a "water logged" condition. During the short time that the heat is on, most of the heat is absorbed in the machine and little reaches the liquid. The severity of the problem can be realized by considering the fact that water contracts about 13% in cooling from 328° F. to 60° F. If the system is permitted to cool to this extent, 13% of the liquid must be discharged upon restarting before equilibrium is established.

To overcome these difficulties, the present invention proposes to deliver to the equipment during the cooling, preferably to the flow passage or discharge line, an amount of fluid sufficient to compensate for the contraction of the liquid during the off or cooling portion of the cycle. It is an object of the invention to provide equipment operating in this way.

The fluid thus supplied may be either a liquid or a gas and is preferably delivered at a point near the exit end of the system, preferably upstream from but relatively close to the control valve. In this way, reopening of the control valve to initiate an on cycle will discharge the added liquid or gas as a part of the initial flow. Supply of such liquid or gas is preferably to a section of the flow passage beyond the zone thereof that is heated. It is an object to supply such a fluid automatically to the system at one of such points or locations.

In the preferred practice of the invention the fluid is supplied under the control of a pressure regulator or other constant pressure source so that it enters the system any time that contraction of the cleaning liquid lowers the pressure in the flow passage to a value below that of the constant pressure of the source. The rate of supply of the fluid is preferably maximized by a restricted orifice so as to be sufficient to compensate for contraction of the cleaning liquid but insufficient to maintain the pressure in the flow passage at such constant value upon reopening of the control valve to start a new on cycle. In this way it is possible to prevent such on and off cycling of the equipment during a normal off cycle as will waterlog the system or cause severe shocks therein. In this latter respect, if the pump starts while the control valve is open there is no severe shock or water-hammer effect. It is an object of the invention to control the pressure and the rate of flow of the fluid in these ways.

If the invention is employed in conjunction with pressure-controlled equipment in which the heat and flow are stopped when the pressure in the flow passage reaches an upper or cut-out limit (e.g., 125 p.s.i.) to initiate an off cycle and is started when such pressure drops to a lower or cut-in limit (e.g., 80 p.s.i.) to initiate an on cycle, the normal operating pressure (e.g., 100 p.s.i.) being between such upper and lower limits, it is an object of the invention to supply the aforesaid fluid to the system at a pressure (e.g., 85 p.s.i.) slightly above the cut-in pressure or limit but below the normal operating pressure.

Other objects and advantages of the invention will be apparent to those skilled in the art from the exemplified embodiments herein shown and described. I have chosen to exemplify the invention as applied to a steam cleaner controlled by a pressure switch acting to start simultaneously the feed pump and the heater at a cut-in pressure and to stop simultaneously this feed and heat at a cut-out pressure. It will be readily apparent however that controls responsive to a property related to pressure can be used, that the invention applies to modulated controls of the heat and feed as well as to the on-off controls exemplified, and that simultaneous operation of the feed and heat controls can be replaced by nonsimultaneous operation thereof without departing from the spirit of the invention.

Referring to the drawing:

Fig. 1 is a flow diagram of a steam cleaner incorporating one embodiment of the invention;

Fig. 2 is a fragmentary view of a portion of Fig. 1;

Fig. 3 is a vertical sectional view of a flow restrictor incorporated in the apparatus of Figs. 1 and 2; and Fig. 4 is a fragmentary flow diagram of a steam cleaner incorporating another embodiment of the invention.

The steam cleaner of Fig. 1 includes a flow control device 9, shown as including a positive displacement pump 10 driven by a motor 11, delivering a stream of cleaning liquid 12 from a receptacle or source 13 into the entrance end of a flow passage. This flow passage may include any zone or chamber wherein the cleaning liquid can be heated in flow but is shown as including the tortuous passage of a coil 15 which may be of the pancake type. The flow passage includes beyond the coil 15 a discharge line 18 having an orificed nozzle structure 20 at the exit end of the flow passage forming the heated cleaning liquid into a cleaning jet 22 directed through the atmosphere to the article to be cleaned. A control valve 24 is positioned upstream of the orifice and may be incorporated as a part of the nozzle structure 20. The discharge line 18 sometimes but not always includes a flexible section, shown as a hose 25.

A heater 28 heats the pressured stream of cleaning liquid as it advances along the coil 15, being shown as a gas burner 29. A heat control device 30 controls the amount of gas delivered to the burner in an on-off manner, being shown as including a valve 31 actuated by a solenoid 32. The valve 31 respectively opens and closes upon energization and de-energization of the solenoid 32.

In the exemplified system control of the flow and heat is by change in pressure in some portion of the flow passage, typically in the discharge line 18. Operated by the pressure therein is a pressure switch 35 shown purely diagrammatically in Fig. 1 as including a diaphragm 36 exposed through a line 37 to the pressure in the discharge line. A connection 38, indicated by dotted lines, operatively connects the diaphragm to switch contacts 40, 41 in such manner as to close the switch contacts upon reduction in pressure in the discharge line 18 to a lower limit, representing the cut-in pressure at which the feed and the heat are to start, and to open the switch contacts 40, 41 upon increase in such pressure to an upper limit, representing the cut-out pressure at which the feed and the heat are to stop. Pressure operated switches with variable upper and lower limits are known and can be adjusted to give the desired spread between these limits, usually a range of 20–50 p.s.i. in commercial units.

The closing and opening of the switch contacts 40, 41 control the energization of a circuit 43 from a source of potential 44. The motor 11 and the solenoid 32 are shown connected in parallel to this circuit so as to be activated simultaneously upon closing of the contacts and deactivated simultaneously upon opening of the contacts. A system of the type thus far described is open to the objections of water-logging, shock, etc., previously mentioned.

To overcome such objections and defects, the invention employs a compensating means 50 supplying a fluid from a pressured source 51 thereof to a portion of the flow passage in sufficient amount to compensate for contraction of the cleaning liquid therein as it cools during an off portion of the cycle. The fluid may be either a liquid or a gas and in Figs. 1 and 2 is shown as delivered to a side connection 53 of the discharge line 18. Fig. 2 shows this side connection as the leg 54 of a tee fitting 55 in the line 18. A pressure regulator 57 reduces the pressure of the source 51 to a constant value intermediate the lower or cut-in pressure in the flow passage and the normal operating pressure therein. The constant or reduced pressure of the regulator 57 delivers fluid via a pipe means 59 to the side connection 53 any time the pressure in the flow passage drops below the pressure established by the regulator 57.

Incorporated in the pipe means 59 is a restrictor 60 providing a restricted orifice 61 which severely restricts the maximum rate of flow of the reduced-pressure flow to the side connection 53. As shown in Fig. 2 the orifice 61 may be in an orifice plate 62 crimped or welded in a bushing 63 which may be threaded directly into the leg 54. The size of the orifice 61 is such as to supply to the flow passage an amount of fluid sufficient to compensate for the pressure drop otherwise taking place therein as a result of the contraction of the cleaning liquid therein upon its cooling during an off cycle. Stated in other words, the orifice 61 supplies sufficient fluid to the flow passage to compensate for the slow contraction due to cooling and to maintain the pressure in the flow passage substantially at the constant pressure supplied by the regulator 57. However, it is sufficiently restricted that it cannot supply enough fluid to the flow passage to fully compensate for the sharp reduction in pressure which takes place therein upon opening of the control valve 24, thus allowing the flow-passage pressure to drop at this time to the cut-in pressure that will start the feed and the heat.

Also preferably incorporated in the pipe means 59 is a check valve 65 preventing flow of the cleaning liquid to the pressure regulator 57 when the pressure in the flow passage exceeds the regulated pressure. As a further precaution if the fluid is a gas, I prefer to incorporate in the pipe means 59 between the check valve 65 and the regulator 57 a dripleg 68 that will trap any cleaning liquid that may leak back through the check valve. A drain cock 69 can be employed to drain the dripleg periodically to remove any leakage.

In the alternative embodiment of Fig. 4 the side connection 53 is in a horizontal section of the discharge line 18 and includes a closed chamber 72 fed at its top by the pipe means 59 through its restrictor 60. Here the source 51 is a source of pressured gas. The closed chamber 72 normally contains a body 73 of the cleaning liquid to a level A—A at the pressure existing in the flow passage, this pressure compressing a body of gas 74 entrapped thereabove by the closed walls of the chamber and the check valve 65. The volume of the chamber 72 can be made to be in excess of the maximum contraction of the cleaning liquid as it cools during a prolonged off cycle. As the pressure in the flow passage reduces due to this cause the compressed gas in the body 74 forces enough of the cleaning liquid from the body 73 into the flow passage to compensate for the contraction and maintain the pressure above the cut-in value. The compressed gas 74 acts on the contacting cleaning liquid initially through expansion and later by receiving gas through the pipe means 59 at the constant pressure of the regulator 57. The restrictor 60 prevents sufficient gas flow to compensate fully for the drop in pressure in the system to the cut-in value upon opening of the control valve 24. By this system the compensating fluid delivered to the flow passage will be the cleaning liquid itself.

By way of example, a typical system of the type of Figs. 1 or 4 may be designed to deliver 100 gallons per hour of cleaning liquid heated to 328° F., the normal operating pressure being 100 p.s.i. gage. The diameter of the orifice 61 in a system in which gas is delivered thereto will be in the neighborhood of $\frac{1}{16}$ inch. If the pressure switch 35 is set to cut in at a lower limit of 80 p.s.i. and cut out at an upper limit of 125 p.s.i. the equipment will cycle normally during continuous use or with quite short periods of closure of the discharge valve 24 with the pressure regulator 57 set at, say, 85 p.s.i., any flows of gas through the orifice 61 when the pressure in the flow passage is 80–85 p.s.i. being small and transitory. If, however, the shut down is sufficient to cause the pressure in the flow passage to drop below 85 p.s.i. more slowly and as a result of the contraction of the cleaning liquid therein induced by cooling, the regulator 57 supplies gas under the control of the orifice 61 to maintain the pressure in the flow passage above the 80 p.s.i. cut-in value, thus preventing restarting of the heat and the feed. When later the control valve 24 is opened, the pressure in the flow passage will drop below 80 p.s.i. and the pressure switch will start the pump 10 and the burner 29. This is because the orifice 61 will not pass sufficient gas to keep up the pressure in the flow passage at this time. The compensating fluid, be it liquid or gas, is among the first to be expelled from the nozzle structure 20 and its small volume does not delay significantly the attainment of equilibrium conditions and the establishment of the ultimate jet 22 of the desired character.

In practice, compressed air is the preferred compensating fluid whether delivered to the flow passage or to the chamber 72 to force a liquid compensating fluid into the flow passage. A source of compressed air is usually already available at points where the invention is commonly used and it is a simple matter to connect the regulator 57 thereto. Particularly if the compensating fluid is a gas delivered directly to the flow passage, it is desirable that the side passage 53 be at a point beyond the heating zone of the coil 15 to avoid any damage to the latter if the heat should come on while a portion of the coil was filled with gas.

The orifice 61 can receive either a gas or a liquid in performing its function of restricting or maximizing the flow rate of the compensating fluid to the flow passage. It should be clear, however, that the restriction provided by the orifice 61 can, within the spirit of the invention, be the result of restrictions in other parts of the system supplying the compensating fluid or the result merely of a small pipe means 59.

Various changes in the equipment shown will be apparent from the examples given and fall within the spirit of the invention as defined in the appended claims.

I claim as my invention:

1. Cleaning apparatus adapted for use with a source of cleaning liquid and a source of pressured fluid, said apparatus including in combination: a heating device including a flow passage having entrance and exit ends; a heater for heating said flow passage; a heat control device controlling the heating action of said heater; a flow control device connecting said source of cleaning liquid and said entrance end of said flow passage to supply a stream of said cleaning liquid to the latter under control of said flow control device; an adjustable control valve at said exit end of said flow passage controlling the rate of discharge therefrom, movement of said control valve toward closed and open positions respectively increasing and decreasing the pressure in said flow passage to upper and lower values above and below a normal operating pressure; a pressure regulator reducing the pressure of said pressured fluid to a constant value above said lower value but below said normal pressure; and pipe means connecting said pressure regulator to said flow passage to conduct thereto the reduced-pressure fluid from said regulator any time the pressure in said flow passage drops below said normal value.

2. Cleaning apparatus adapted for use with a source of cleaning liquid, said apparatus including in combination: a heating device including a flow passage having entrance and exit ends; a heater for heating said flow passage; a heat control device controlling the heating action of said heater; a flow control device connecting said source of cleaning liquid and said entrance end of said flow passage to supply a stream of said cleaning liquid to the latter under control of said flow control device; an adjustable control valve at said exit end of said flow passage controlling the rate of discharge therefrom; means connected to said heat control device and to said flow control device for stopping said heating action and the supply of cleaning liquid when said control valve is closed, the progressive cooling of the cleaning liquid in said flow passage causing it to contract and reduce the pressure in said flow passage to a value below the normal operating pressure therein; a source of fluid under pressure slightly below said normal operating pressure; and a restricted pipe means connecting said source of fluid and said flow passage to deliver pressured fluid from the former to the latter in amount sufficient to maintain the pressure in said flow passage substantially equal to the pressure of said source of fluid during such contraction of said cleaning liquid.

3. Cleaning apparatus as defined in claim 2 in which said pipe means includes a check valve preventing flow of said cleaning liquid from said flow passage to said source of fluid.

4. Cleaning apparatus as defined in claim 2 in which said pipe means communicates with said flow passage at a position upstream from but near said control valve.

5. Cleaning apparatus adapted for use with a source of cleaning liquid and a source of pressurized fluid, said apparatus including in combination: a heating device including a flow passage having entrance and exit ends; a heater for heating said flow passage; a heat control device controlling the heating action of said heater; a flow control device connecting said source of cleaning liquid and said entrance end of said flow passage to supply a stream of said cleaning liquid to the latter under control of said flow control device; an adjustable control valve at said exit end of said flow passage controlling the rate of discharge therefrom, movement of said control valve toward open and closed positions respectively decreasing and increasing the pressure in said flow passage to cut-in and cut-out values respectively below and above a normal operating pressure; a pressure responsive device connected to said flow passage and responsive to changes in pressure therein between said cut-in and cut-out values; means connecting said pressure responsive device to said flow control device and to said heat control device to reduce the flow of cleaning liquid and the heating action of said heater upon increase in pressure in said flow passage to said cut-out value and to increase such flow and such heating action upon drop in pressure in said flow passage to said cut-in value; a pressure regulator adapted for connection to said source of pressurized fluid, said pressure regulator reducing the pressure of said fluid to a constant value above said cut-in value but below said normal operating pressure; and pipe means delivering the reduced-pressure fluid from said regulator to said flow passage to maintain the pressure therein above said lower limit.

6. In combination in a device producing a cleaning jet: a heating device including walls defining a chamber; a pump havig its discharge connected to said chamber to supply a cleaning liquid thereto; a heater for heating said chamber and the cleaning liquid therein; a discharge line connected to said chamber having a discharge orifice and a side connection upstream therefrom, the heated liquid flowing as a stream from said chamber along said discharge line past said side connection and discharging from said orifice into the atmosphere as a cleaning jet, said solution in said chamber and said discharge line tending to cool and volumetrically contract upon decrease in the rate of flow and the amount of heat supplied by said heater to said chamber; a source of pressured fluid; and means for supplying sufficient pressured fluid from said source to said side connection in amount related to said contraction.

7. In combination in a device producing a cleaning jet: a heating device including walls defining a chamber; a pump having its discharge connected to said chamber to supply a cleaning liquid thereto; a heater for heating said chamber and the cleaning liquid therein; a discharge line connected to said chamber having a discharge orifice and a side connection up stream therefrom, the heated liquid flowing as a stream from said chamber along said discharge line past said side connection and discharging from said orifice into the atmosphere as a cleaning jet; a control valve in said discharge line upstream from said discharge orifice movable between open and closed positions to start and stop said flow; means responsive to a closing of said control valve for stopping said pump and the heating of said chamber by said heater, the liquid in said chamber and said discharge line cooling and volumetrically contracting upon such stoppage; and means for delivering a pressured fluid to said discharge line through said side connection in amount sufficient to compensate at least in part for said volumetric contraction of said cleaning liquid during such stoppage.

8. In combination in a device producing a cleaning jet: a heating device including a flow passage having entrance and exit ends; a heater for heating said flow passage; a pump having its discharge connected to said entrance end of said flow passage to supply a stream of cleaning liquid thereto; a control valve in said flow passage near said exit end controlling the flow therefrom, movement of said control valve toward open and closed positions respectively decreasing and increasing the pressure in said flow passage to cut-in and cut-out values respectively below and above a normal operating pressure; a pressure responsive device connected to said flow passage and responsive to changes in pressure therein between said cut-in and cut-out values; means for stopping said pump and the heating action of said heater upon increase in pressure in said flow passage to said cut-out value and for restarting said flow and said heating action of said heater upon drop in pressure in said flow passage to said cut-in value, said cleaning liquid in said flow passage cooling and contracting upon closure of said control valve thus tending to reduce the pressure in said flow passage to said cut-in value; a side connection opening on said flow passage upstream from said control valve; and means for supplying a compensating fluid to said side passage at a controlled pressure between said cut-in value and said normal operating pressure to maintain the pressure in said flow passage above said cut-in value during periods of contraction of said cleaning liquid when the pressure in said flow passage is less than is less than said controlled pressure.

9. A combination as defined in claim 8 in which said last-named means includes a pressure regulator, pipe means connecting said pressure regulator to said side connection, and a check valve in said pipe means preventing flow of said cleaning liquid to said pressure regulator.

10. A combination as defined in claim 9 including a dripleg in said pipe means between said check valve and said pressure regulator collecting any leakage from said check valve and protecting said pressure regulator therefrom.

11. A combination as defined in claim 8 in which said last-named means includes a pressure regulator, pipe means connecting said pressure regulator to said side connection, and a restricted orifice in said pipe means restricting the rate of flow of gas to said flow passage, said orifice supplying sufficient gas to compensate for said contraction but insufficient gas to prevent dropping of the pressure in said flow passage to said cut-in value upon opening said control valve.

References Cited in the file of this patent
UNITED STATES PATENTS

| | | |
|---|---|---|
| 2,295,228 | Malsbary et al. | Sept. 8, 1942 |
| 2,345,614 | Malsbary et al. | Apr. 4, 1944 |
| 2,720,868 | Wollner et al. | Oct. 18, 1955 |
| 2,755,130 | Arant | July 17, 1956 |
| 2,790,678 | Arant | Apr. 30, 1957 |